US012614324B2

(12) United States Patent
Livathinos et al.

(10) Patent No.: US 12,614,324 B2
(45) Date of Patent: Apr. 28, 2026

(54) IMAGE TABLE GENERATION

(71) Applicant: INTERNATIONAL BUSINESS MACHINES CORPORATION, Armonk, NY (US)

(72) Inventors: Nikolaos Livathinos, Adliswil (CH); Maksym Lysak, Waedenswil (CH); Ahmed Samy Nassar, Zurich (CH); Peter Willem Jan Staar, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 18/339,263

(22) Filed: Jun. 22, 2023

(65) Prior Publication Data

US 2024/0233223 A1     Jul. 11, 2024

(30) Foreign Application Priority Data

Jan. 9, 2023     (GR) ............................... 20230100007

(51) Int. Cl.

| | |
|---|---|
| *G06T 11/60* | (2026.01) |
| *G06F 40/174* | (2020.01) |
| *G06F 40/177* | (2020.01) |
| *G06F 40/186* | (2020.01) |
| *G06F 40/205* | (2020.01) |

(Continued)

(52) U.S. Cl.
CPC ............ *G06T 11/60* (2013.01); *G06F 40/174* (2020.01); *G06F 40/177* (2020.01); *G06F 40/186* (2020.01); *G06F 40/205* (2020.01); *G06F 40/284* (2020.01); *G06V 10/774* (2022.01); *G06V 30/412* (2022.01)

(58) Field of Classification Search
CPC ...... G06T 11/60; G06F 40/174; G06F 40/177; G06F 40/186; G06F 40/205; G06F 40/284; G06V 10/774; G06V 30/412

USPC ......................................................... 715/227
See application file for complete search history.

(56) References Cited

U.S. PATENT DOCUMENTS

| | | | |
|---|---|---|---|
| 10,133,949 B2 | 11/2018 | Taranta, II | |
| 10,546,054 B1 * | 1/2020 | Foroughi | G06N 20/00 |

(Continued)

FOREIGN PATENT DOCUMENTS

| | | |
|---|---|---|
| EP | 3923210 A1 | 12/2021 |

OTHER PUBLICATIONS

Raman, Natraj, et al. "Synthetic Document Generator for Annotation-Free Layout Recognition." Pattern Recognition, vol. 128, Aug. 2022, p. 108660, https://doi.org/10.1016/j.patcog.2022.108660. Accessed Apr. 8, 2022. (Year: 2022).*

(Continued)

*Primary Examiner* — Stephen S Hong
*Assistant Examiner* — Broderick C Anderson
(74) *Attorney, Agent, or Firm* — Kelsey M. Skodje

(57) ABSTRACT

A method for automatically generating table images includes determining a table configuration including a number of rows of the table, a number of columns of the table and a spanning area of the table, the spanning area indicating a fraction of spanning cells in the table. The table may be generated in accordance with the table configuration. Content may be inserted into cells of the table using a selected content template. An image table of an appearance of the table may be created and the image table may be provided.

19 Claims, 13 Drawing Sheets

(51) Int. Cl.

| | |
|---|---|
| *G06F 40/284* | (2020.01) |
| *G06V 10/774* | (2022.01) |
| *G06V 30/412* | (2022.01) |

(56) References Cited

U.S. PATENT DOCUMENTS

| | | | | |
|---|---|---|---|---|
| 10,635,939 | B2 | 4/2020 | Watson | |
| 10,726,304 | B2 | 7/2020 | Hotson | |
| 10,755,115 | B2 | 8/2020 | Avidan | |
| 10,993,687 | B2 | 5/2021 | Itu | |
| 11,087,081 | B1 * | 8/2021 | Srivastava | G06N 20/00 |
| 11,416,712 | B1 | 8/2022 | Dizche | |
| 2014/0115007 | A1 | 4/2014 | Harvey | |
| 2020/0320371 | A1 | 10/2020 | Baker | |
| 2021/0097341 | A1 * | 4/2021 | Marco | G06F 18/214 |
| 2022/0198179 | A1 * | 6/2022 | Guignard | G06T 19/20 |
| 2023/0095673 | A1 * | 3/2023 | Dharmasiri | G06V 10/454 |
| | | | | 382/157 |
| 2023/0420089 | A1 * | 12/2023 | Sublett | G16H 50/70 |

OTHER PUBLICATIONS https://developer.ibm.com/exchanges/data/all/synthtabnet/, "SynthTabNet", Published Mar. 20, 2022, IBM Developer, 4 pages.

https://ds4sd.github.io/, "Deep Search", IBM Deep Search Homepage, Accessed on Jan. 23, 2023, 5 pages.

https://research.ibm.com/topics/accelerated-discovery, "Accelerated Discovery", IBM research, Accessed on Jan. 23, 2023, 7 pages.

Nassar et al., "TableFormer: Table Structure Understanding with Transformers", arXiv:2203.01017v2 [cs.CV] Mar. 11, 2022, pp. 1-16.

Qasim et al., "Rethinking Table Recognition using Graph Neural Networks", arXiv:1905.13391v2 [cs.CV] Jul. 3, 2019, 6 pages.

Raab et al., "Guidelines for Producing Useful Synthetic Data", arXiv:1712.04078v1 [stat.AP] Dec. 12, 2017, pp. 1-19.

Raman et al., "Synthetic document generator for annotation-free layout recognition", Pattern Recognition 128 (2022) 108660, ©2022 Elsevier Ltd., pp. 1-15.

* cited by examiner

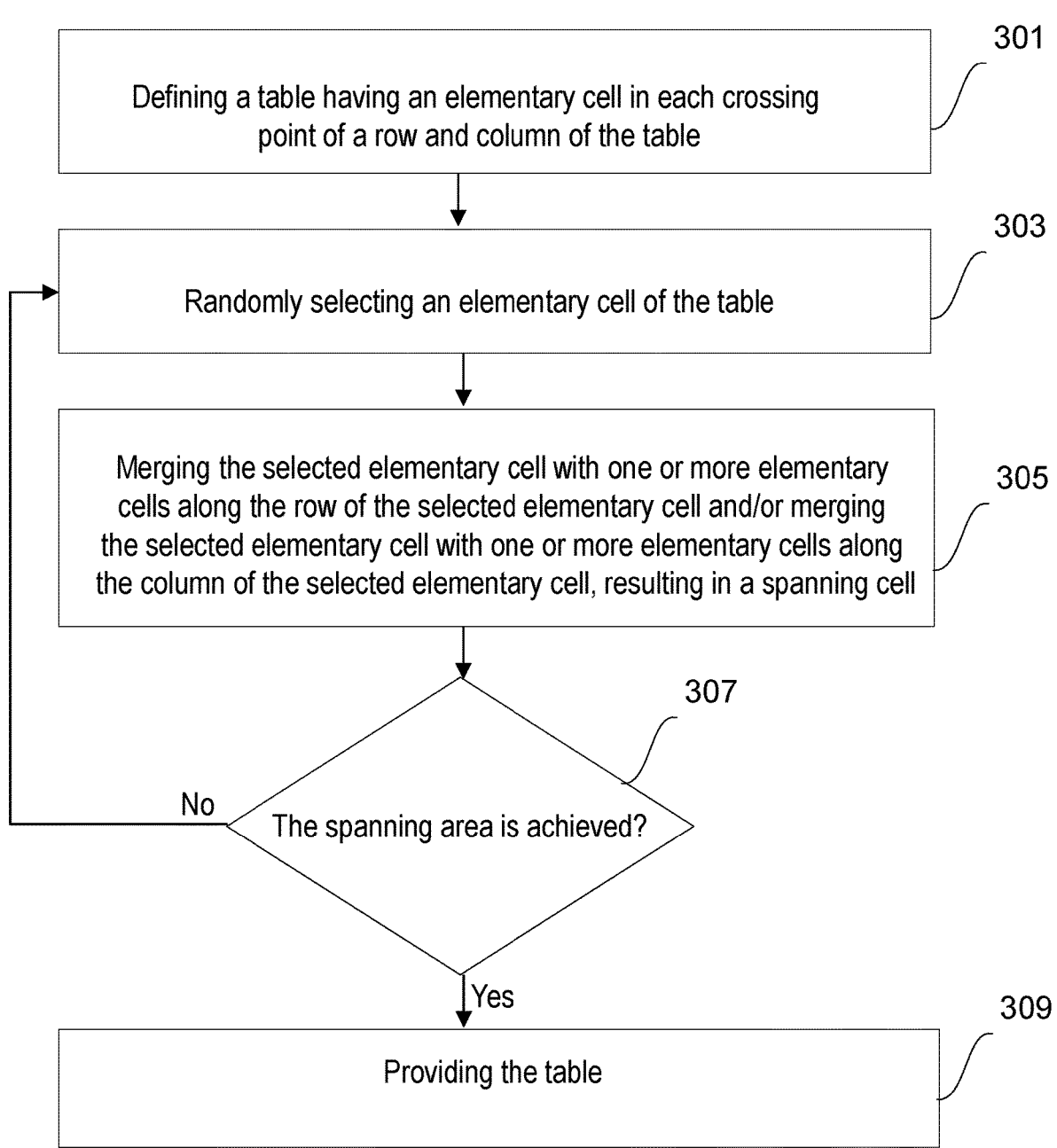

301

Defining a table having an elementary cell in each crossing
point of a row and column of the table

303

Randomly selecting an elementary cell of the table

305

Merging the selected elementary cell with one or more elementary
cells along the row of the selected elementary cell and/or merging
the selected elementary cell with one or more elementary cells along
the column of the selected elementary cell, resulting in a spanning cell

307

No     The spanning area is achieved?

Yes

309

Providing the table

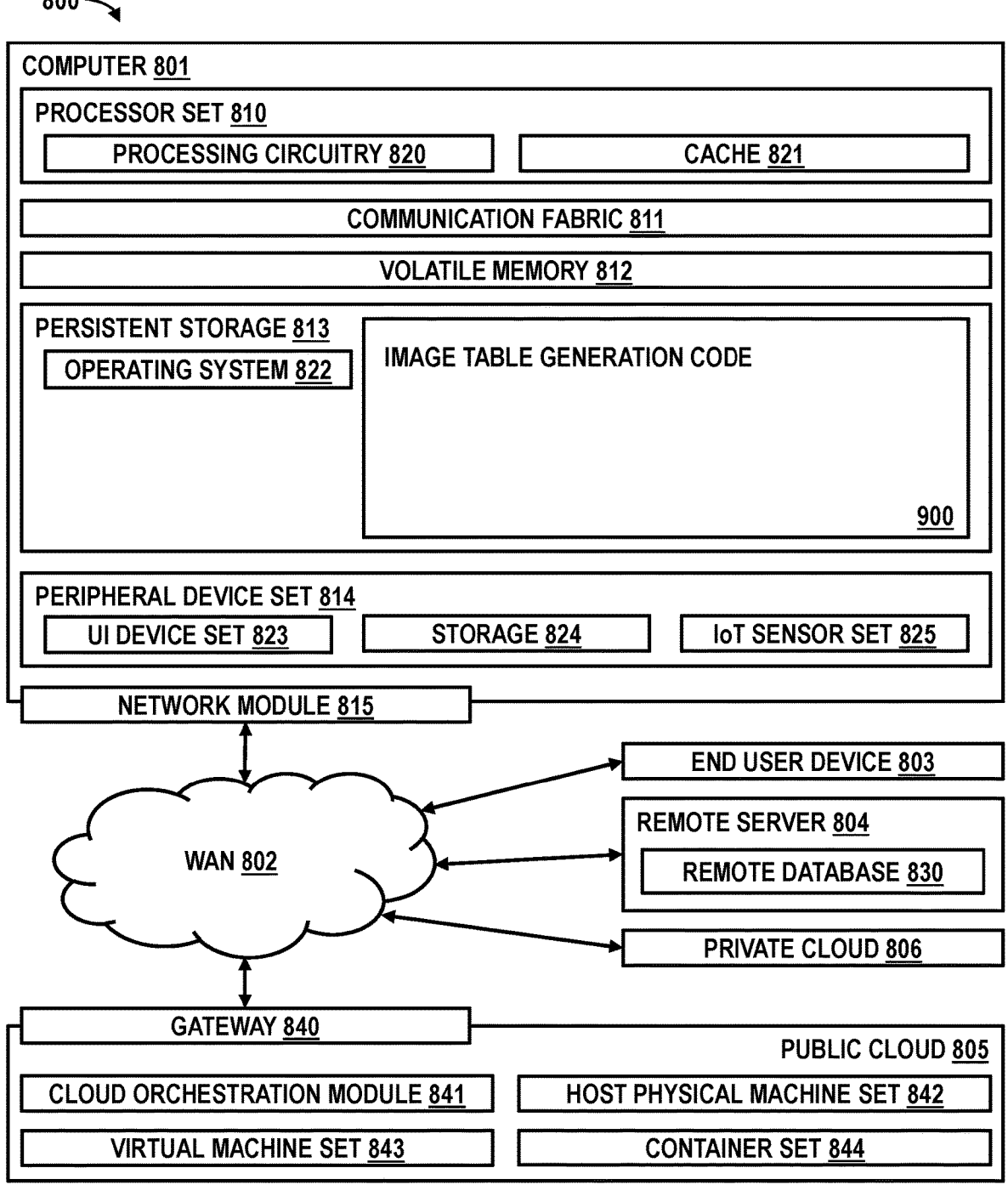

COMPUTER 801

PROCESSOR SET 810

PROCESSING CIRCUITRY 820          CACHE 821

COMMUNICATION FABRIC 811

VOLATILE MEMORY 812

PERSISTENT STORAGE 813

OPERATING SYSTEM 822

IMAGE TABLE GENERATION CODE

900

PERIPHERAL DEVICE SET 814

UI DEVICE SET 823          STORAGE 824          IoT SENSOR SET 825

NETWORK MODULE 815

WAN 802

END USER DEVICE 803

REMOTE SERVER 804

REMOTE DATABASE 830

PRIVATE CLOUD 806

GATEWAY 840

PUBLIC CLOUD 805

CLOUD ORCHESTRATION MODULE 841          HOST PHYSICAL MACHINE SET 842

VIRTUAL MACHINE SET 843          CONTAINER SET 844

*Figure 9*

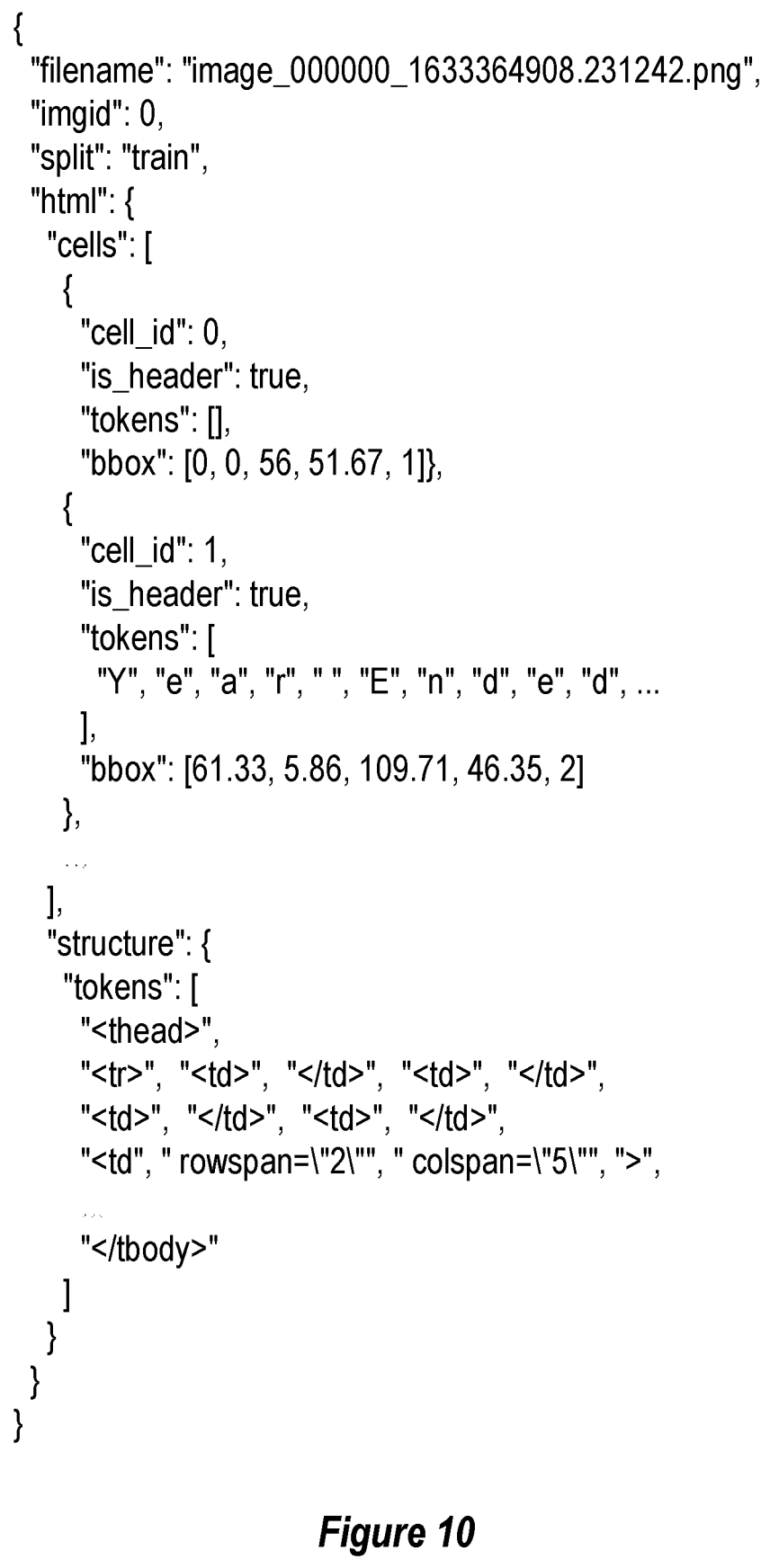

```
{
  "filename": "image_000000_1633364908.231242.png",
  "imgid": 0,
  "split": "train",
  "html": {
   "cells": [
     {
       "cell_id": 0,
       "is_header": true,
       "tokens": [],
       "bbox": [0, 0, 56, 51.67, 1]},
     {
       "cell_id": 1,
       "is_header": true,
       "tokens": [
         "Y", "e", "a", "r", " ", "E", "n", "d", "e", "d", ...
       ],
       "bbox": [61.33, 5.86, 109.71, 46.35, 2]
     },
       ...
   ],
   "structure": {
     "tokens": [
       "<thead>",
       "<tr>", "<td>", "</td>", "<td>", "</td>",
       "<td>", "</td>", "<td>", "</td>",
       "<td", " rowspan=\"2\"", " colspan=\"5\"", ">",

...

"</tbody>"
     ]
   }
  }
}
```

*Figure 10*

```
"generator": {
    "type": "Generator01",
    "dataset_size": 150000,
    "split_ratios": {"train": 0.8, "val": 0.1, "test": 0.1},
    "nrows_limits": [4, 25],
    "ncols_limits": [3, 15],
    "span_types": ["rowspan", "colspan", "2dspan"],
    "styles": ["style_pubtabnet_common.css", "style_pubtabnet_altrow.css", "style_pubtabnet_grid.css",
"style_pubtabnet_row_border.css"],
    "contents": ["content_pubtabnet_1000.json", "content_pubtabnet_100.json", "content_perc.json",
"content_small_number.json"],
    "max_rowspan": 10,
    "max_colspan": 10,
    "max_image_size": 512,
    "max_tag_length": 512,
    "span_coverage": 0.2,
    "header_rows_limits": [1, 3],
    "header_spans_only": true,
    "rendering_batch_size": 100,
    "save_dir": "/data/synthtabnet/pubtabnet",
    "save_debug": false
  }
```

| Names | Amount | |
|-------|--------|------|
| 1. Item | 1000 | unit |
| 2. Item | 500 | unit |
| 3. Item | 3500 | unit |
| 4. Item | 150 | unit |

```
<TR>
<TD>      </TD><TD colspan="2">      </TD>
</TR><TR>
<TD>      </TD><TD>...
...
```

IMAGE TABLE GENERATION

BACKGROUND

The present invention relates to the field of digital computer systems, and more specifically, to a method for generating image tables.

The occurrence of tables in documents is ubiquitous. They often summarise quantitative or factual data, which may be cumbersome to describe in verbose text but nevertheless extremely valuable. However, this compact representation may be often not easy to parse by machines. For example, tables often have complex column and row-headers in order to reduce duplicated cell content. Lines of different shapes and sizes are leveraged to separate content or indicate a tree structure. Additionally, tables can also have empty or missing table-entries or multi-row textual table-entries.

SUMMARY

Various embodiments provide a method for generating image tables, computer program product and system as described by the subject matter of the independent claims. Advantageous embodiments are described in the dependent claims. Embodiments of the present invention can be freely combined with each other if they are not mutually exclusive.

In an aspect, the invention relates to a method for automatically generating table images. The method includes determining a table configuration, the table configuration including a number of rows of the table, a number of columns of the table and a spanning area of the table, the spanning area indicating a fraction of spanning cells in the table, providing table content templates including table contents, generating the table in accordance with the table configuration, selecting a table content template of the table content templates, inserting content into cells of the table using the selected content template, creating an image table of an appearance of the table, providing the image table.

In an aspect the invention relates to a computer program product including a computer-readable storage medium having computer-readable program code embodied therewith, the computer-readable program code configured to implement the method of the above embodiment.

In an aspect the invention relates to a computer system for automatically generating table images. The computer system is configured for determining a table configuration, the table configuration including a number of rows of the table, a number of columns of the table and a spanning area of the table, the spanning area indicating a fraction of spanning cells in the table, providing table content templates including table contents, generating the table in accordance with the table configuration, selecting a table content template of the table content templates, inserting content into cells of the table using the selected content template, creating an image table of an appearance of the table, providing the image table.

BRIEF DESCRIPTION OF THE DRAWINGS

In the following embodiments of the invention are explained in greater detail, by way of example only, making reference to the drawings in which:

FIG. 3 is a flowchart of a method for generating the table in accordance with the table configuration in accordance with an example of the present subject matter.

FIG. 9 is a computing environment in accordance with an example of the present subject matter.

FIG. 10 shows an example content of an annotation file in accordance with an example of the present subject matter.

FIG. 11 shows an example content of a configuration file in accordance with an example of the present subject matter.

DETAILED DESCRIPTION

Figure 1:
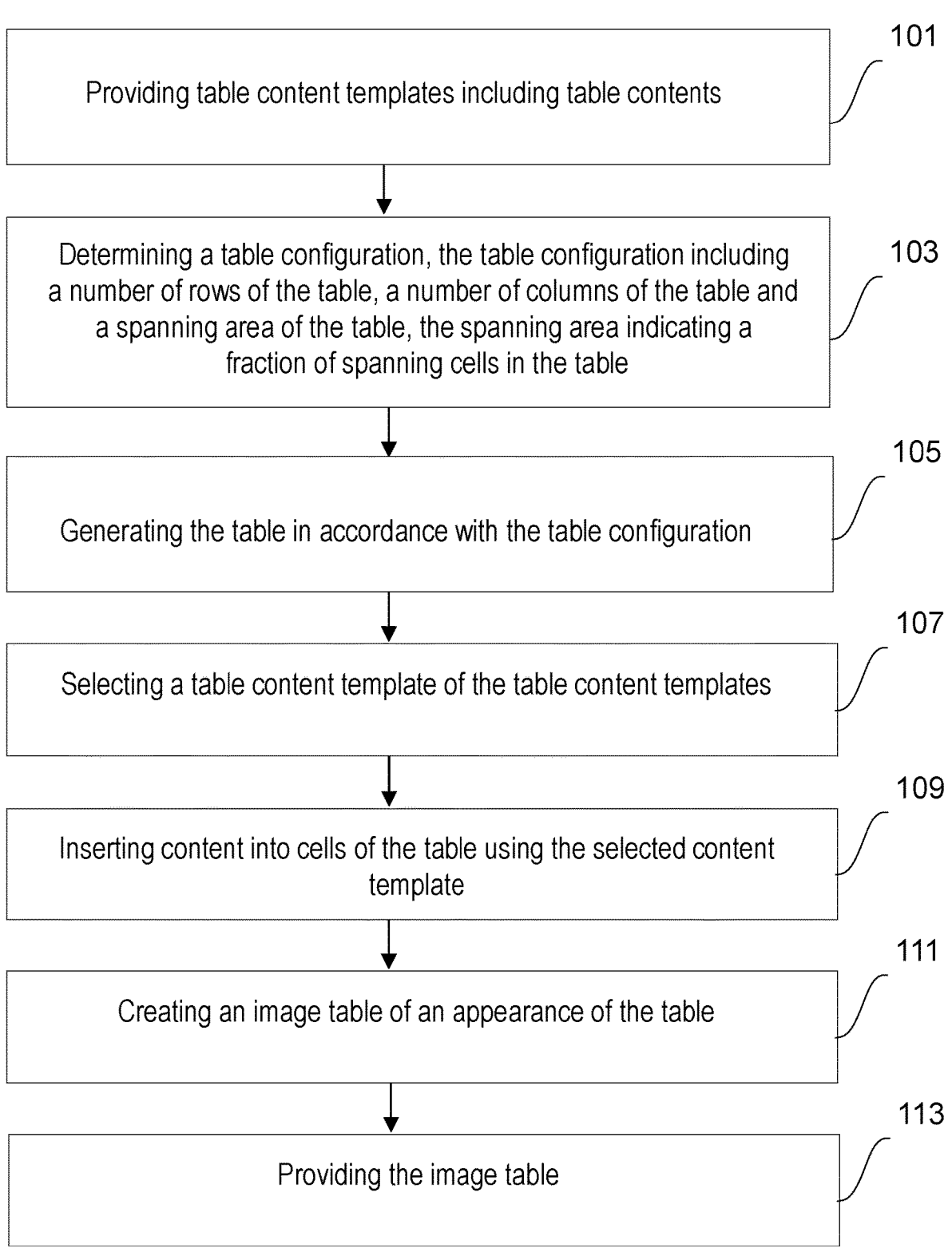
FIG. 1 is a flowchart of a method for generating table images in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "table" refers to a collection of related data held in a structured format. The table consists of columns (fields), and rows (or records). The table may include cells of first type. Each cell of first type may span one column and one row e.g., the number of cells of the table may be equal to the number of columns multiplied by the number of rows if the table has only the first type cells. The first type cells may be referred to as elementary cells as they each span one row and one column. The present subject matter may provide a second type of cells that span more than one column and/or more than one row. The second type cells may be referred to as spanning cells.

Based on these second type cells, the table configuration may define a desired spanning area of the table to be generated and a (initial) number of rows and a number of columns. The spanning area may include a number of one or more spanning cells. The spanning area may be defined such that the number of remaining elementary cells of the table is higher a minimum number of elementary cells that keep the structure by the initial number of columns and number of rows.

Considering spanning cells may be advantageous as the spanning cells may be the most difficult structure elements to recognize and detect with a recognition tool. The present subject matter may provide a better control over the structure, the content, and the appearance of the generated tables. As a result, it may enable the development of artificial intelligence (AI) models that can cover a broader spectrum of use cases.

The generation of the image table (and its annotation) according to the present subject matter may be more accurate compared to a manual creation and annotation of the image tables that is error prone. In addition, the generation of the image table may reduce the processing overhead that is caused by a manual and individual creation of image tables. The generated image tables may be used to accurately train a machine learning model.

The present subject matter may enable to generate synthetic datasets that allow a fine-grained control over major aspects of document tables such as table structure, table content and table appearance. From one side highly customized datasets that match the needs e.g., of a particular domain, may be generated and additionally such scope-specific datasets may be combined to create new datasets with a very high variance.

The present subject matter may produce table structures with specialized table headers, and table cells that can span in a much more flexible way. This may include multi-column cells (horizontal spans), cells with dissimilar heights inside the same table row (vertical spans), and cells with 2-dimensional spans across multiple table rows and columns.

According to an example, the image table is provided in association with an annotation file including a structural information of the image table and geometrical information of the image table. Thus, the generated synthetic document tables are described both structurally and geometrically. The provision of both the structural information and the geometrical information may enable a controlled and accurate (re)production of the image tables. For example, if only the geometrical information of the table is provided, there may be several possible table structures that can fulfill the same geometrical constraints, however, this may not be suitable for a controlled generation of tables.

The structural information of the image table includes a number of rows inside the table header, types of cell spans, the total amount of spanning cells, presence of cell spans in the table header or both in the header and the table body. The geometrical information of the image table includes the table position, cell positions within the table and cell sizes. In an example, the geometrical information may include coordinates of bounding boxes (BBOX) of the cells of the table. The bounding box may for example, be defined by the coordinates of the left, top, right and bottom corners of the box. The annotation file may for example, be a text file or XML file (e.g., JSON file) including values of attributes, where each attribute represents a structural information or a geometrical information.

According to an example, the method may be repeated in order to provide multiple image tables. A different table configuration may be used in each repetition of the method. The repetition may be performed until a desired amount of image tables is reached or until a maximum number of repetitions is reached. Each of the multiple image tables may be provided in association with a respective annotation file that describes each image table. The image tables and the corresponding annotation files may form a training dataset. The training dataset may be used for training a table recognition model to identify layout elements of image tables. The table recognition model may be configured to receive as input an image table, e.g., a screenshot of a table, and to predict or provide an output which includes a prediction of the table structure, table geometry and table content.

For example, a range of possible values of the number of rows, a range of possible values of the number of columns and a range for possible values of the spanning area may be provided. These ranges may be provided in a configuration file. In each repetition of the method, the table configuration may be determined by selecting, e.g., from the configuration file, a number of rows and/or a number of columns and/or a spanning area randomly from the respective range, such that the table configuration of the current repetition is different from the previously used table configurations in the previous repetitions of the method. This may enable a parametric probabilistic method for generating tables.

This may be advantageous because the characteristics of the generated image tables allow to cover a broader spectrum of usage scenarios during the development of artificial intelligence (hereinafter "AI") models. For example, this may enable to develop custom AI models for the document templates used by a client or to develop services able to recognize an extensive range of document types.

According to an example, each table content template represents a different domain ontology, where the table configuration further indicates a desired domain ontology, where the selected table content template is the template whose domain ontology matches the desired domain ontology. A domain ontology (or domain-specific ontology) represents concepts which belong to a realm of the world, such as biology or finance.

This example may be advantageous as it may provide image tables to specific needs. For example, a client may be interested in a model trained to recognize tables created in the banking field. This example may enable to train the model using focused and specified tables for the field of banking. This may enable reliable and accurate inference results of the model.

According to an example, providing a table content template includes providing one or more databases of image tables, parsing content of cells of the image tables in the databases, tokenizing the parsed content, resulting in tokens, determining types of the resulting tokens, where the determined types include string type and non-string type, determining an occurrence frequency of each token of string type, and inserting in the table content template the most frequent string tokens and the determined non-string types.

The databases used to generate a specific table content template may be selected based on a domain ontology of the specific table content template. The most frequent string may be a string having an occurrence frequency higher than a predefined threshold. The non-string type may for example, be an INTEGER type, FLOAT type or PERCENTAGE type. The table content template may be, for example, a text file, such as a CSV-formatted text file or an XML file. The table content template contains the most frequent strings and the names of the non-string types, e.g., INTEGER, FLOAT etc.

According to an example, inserting content into cells of the table using the selected table content template includes for each cell of the table: randomly selecting one or more token strings of the selected table content template, or randomly generating one or more values of a non-string type in the selected table content template, and inserting in the cell the selected token strings or the generated values. For example, the generation of two values of a non-string type such as an INTEGER type may result in two integer numbers, the generation of one value of a non-string type such as a PERCENTAGE type may result in one percentage value and so on. Randomly generating content of the table may enable a parametric probabilistic method for generating tables.

According to an example, the creating of the image table includes rendering the table using a headless browser and taking a screenshot of rendered table. A headless browser may for example, be a web browser without a graphical user interface. The headless browser may enable an automated control of the image table generation e.g., via a command-line interface.

According to an example, the method further includes providing table style templates. The table style template describes a presentation style of the table. One of the table style templates may be selected based on the determined table configuration. The generation of the table and the insertion of the content in the cells may be performed in accordance with styles defined by the selected table style template.

The table style template may indicate, for example, the font size, the font type, the cell widths, the cell heights etc. In an example, the table style template may be randomly selected from the provided table style templates.

According to an example, each table style template represents a respective domain ontology, where the table configuration further indicates a desired domain ontology, where the selected table style template is the template whose domain ontology matches the desired domain ontology.

According to an example, generating the table in accordance with the table configuration includes A) defining a table having an elementary cell in each crossing point of a row and column of the table, B) randomly selecting an elementary cell of the table, C) merging the selected elementary cell with one or more elementary cells along the row of the selected elementary cell and/or merging the selected elementary cell with one or more elementary cells along the column of the selected elementary cell, resulting in a spanning cell, D) determining whether the spanning area is achieved, in response to determining that the spanning area is not achieved repeating the random selection step B) and the merging step C) and step D, and in response to determining that the spanning area is achieved providing the table.

For example, the table configuration may include a desired number of rows and columns and a maximum number rows to span in a spanning cell and a maximum number of columns to span in a spanning cell. The spanning area may include a maximum number of spanning cells to be created in the table such that the number of columns and number of rows of the resulting table is still the desired ones in the table configuration e.g., this may not be the case if a spanning cell spans all cells of two rows, as this may result in fewer number of rows.

The merging of the selected elementary cell with one or more elementary cells along the row of the selected elementary cell may be performed by, for example, randomly selecting the number of one or more elementary cells along the row. In an example, the selected number of one or more elementary cells along the row may be smaller than the maximum number of columns to span as defined in the table configuration.

The merging of the selected elementary cell with one or more elementary cells along the column of the selected elementary cell may be performed by, for example, randomly selecting the number of one or more elementary cells along the column. In an example, the selected number of one or more elementary cells along the column may be smaller than the maximum number of rows to span as defined in the table configuration.

According to an example, the table configuration further indicates a header and body of the table, where the table content template includes header table contents and body table content. This example may further improve the representability of the generated image tables, e.g., the automatically generated tables may be as close as possible to real tables.

According to an example, the method further includes training the table recognition model to identify layout elements of image tables using the generated image tables and associated annotation files.

The performance of an AI model may advantageously make use of the automated creation of the training dataset for the following reasons. The size of the training dataset may not be limited as it is the case with the manually created datasets. Tables of the training dataset are not skewed towards simpler structures with fewer number of rows and columns. The training dataset may include a non-limited variance in the appearance styles. The creation of the training dataset may prevent labour intensive, error prone, expensive, difficult to adjust, and slow to develop approaches.

According to an example, the method further includes using the trained model for recognizing image table objects.

According to an example, the table configuration further indicates a desired domain ontology, where the table configuration in each repetition has a number of rows and/or number of columns and/or spanning area and/or domain ontology that are different from each previously used table configuration.

According to an example, the method further includes storing the generated image table in a database.

According to an example, the domain ontology matches the desired domain ontology if the domain ontology is the desired domain ontology or a subdomain of the desired domain ontology.

According to an example, the structural information of the image table includes a number of rows inside the table header, types of cell spans, the total amount of spanned cells, presence of cell spans in the table header or both in the header and the table body, where the geometrical information of the image table includes table position, cell positions and cell sizes.

For example, the present method may use techniques that ensure high quality and greater variance for the generated content tables. More specifically the present content generation method may consist of a preparation phase and a generation phase. The preparation phase may include the table content template preparation and the generation phase may include the usage of the content of the table content template to generate the table content.

The preparation phase may include the steps of deciding which document corpora to use as the source for the content of the table header and separately for the table body, automatically identifying keyword terms that can be generalized (e.g., monetary values, integer numbers, decimal numbers, percentages, etc.), parsing the source documents and extracting the most frequently used terms and manually curating the automatically extracted terms.

The generation phase may include the steps of selecting a table content template, differentiating the table content generation for the table header and the table body, randomly selecting a keyword and instantiating it (e.g., by generating a specific value for <USD>, a specific number for <INTEGER> etc.), randomly selecting one of the most frequently used terms. The selection of the most frequently used terms, the distinction between the content for the table header versus table body and the manual curation of the vocabulary may ensure high quality of content. Also, the keyword-based synthesis may increase the variance of the content.

FIG. 1 is a flowchart of a method for generating table images in accordance with an example of the present subject matter.

Table content templates including table contents may be provided in step 101. A table configuration may be determined in step 103. The table configuration includes a number of rows of the table, a number of columns of the table and a spanning area of the table. The spanning area indicates a fraction of spanning cells in the table. The table may be created in step 105 in accordance with the table configuration. A table content template may be selected in step 107 from the provided table content templates. Content may be inserted in step 109 into cells of the table using the selected content template. An image table of an appearance of the table may be created in step 111. The image table may be provided in step 113.

In an example, steps 103 to 113 may be repeated until a predefined number of image tables is provided. Each image table may be provided in association with an annotation file descriptive of the image table. The annotation file may include structural information and geometrical information of the image table.

In an example, steps 103 to 113 may be automatically performed e.g., on a periodic basis or upon receiving a request to generate the image table.

In an example, the table configuration determination in step 103 may be performed by reading a configuration file such as the configuration file shown in FIG. 11. For example, a number of rows may randomly be selected from the range defined in attribute "nrows limits" of the configuration file, a number of columns may randomly be selected from the range defined in attribute "ncols_limits" of the configuration file, and spanning area may be selected as the value of the attribute "span_coverage" of the configuration file. These selected number of rows, columns and spanning area may form the table configuration of step 103.

Figure 2:
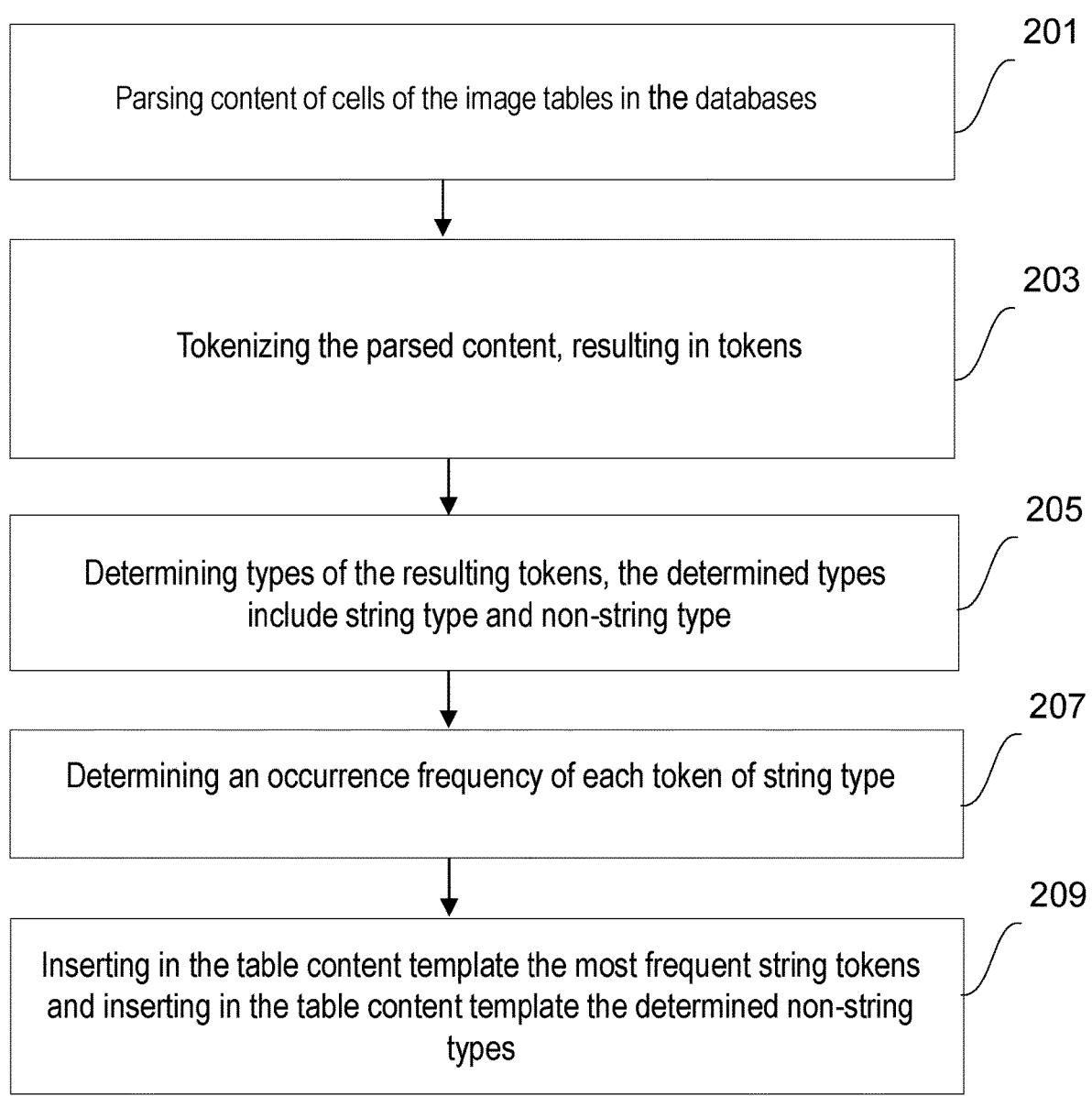
FIG. 2 is a flowchart of a method for creating a table content template in accordance with an example of the present subject matter.

FIG. 2 is a flowchart of a method for creating a table content template in accordance with an example of the present subject matter.

Content of cells of image tables in predefined databases may be parsed in step 201. The parsed content may be tokenized in step 203, resulting in tokens. Types of the resulting tokens may be determined in step 205. The determined types include string type and non-string type. An occurrence frequency of each token of string type may be determined in step 207. It may be inserted in step 209 in the table content template the most frequent string tokens and the determined non-string types.

FIG. 3 is a flowchart of a method for generating the table in accordance with the table configuration in accordance with an example of the present subject matter.

A table having a cell, named elementary cell, in each crossing point of a row and column of the table may be defined ins step 301. An elementary cell of the table may be randomly selected in step 303. The selected elementary cell may be merged in step 305 with one or more elementary cells along the row of the selected elementary cell and/or the selected elementary cell may be merged with one or more elementary cells along the column of the selected elementary cell. This merging may result in a spanning cell in the table. It may be determined in step 307 whether the spanning area is achieved. In response to determining that the spanning area is not achieved steps 301 to 309 may be repeated. In response to determining that the spanning area is achieved the table may be provided in step 309.

Figure 4:
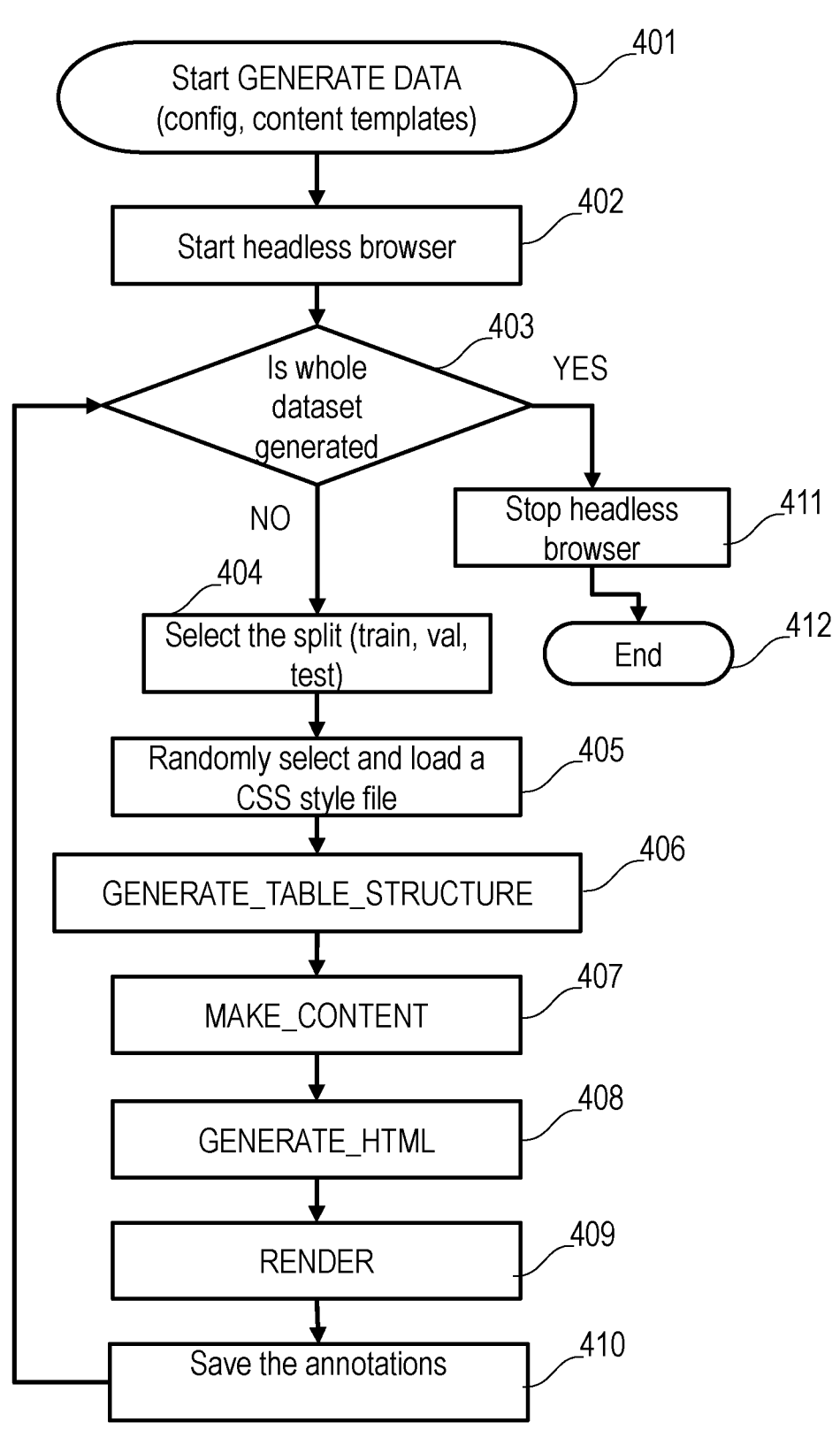
FIG. 4 is a flowchart of a method for generating a dataset of table images in accordance with an example of the present subject matter.

FIG. 4 is a flowchart of a method for generating a dataset of table images in accordance with an example of the present subject matter.

At the start of the generation of the dataset, a configuration file and table content templates may be provided in step 401. A headless browser may be started in step 402. It may be determined in step 403 whether the whole dataset is generated. If the whole dataset is not generated steps 404 to 410 may be performed, otherwise, steps 411 and 412 may be performed.

The purpose of using the image table to be generated may be selected or determined in step 404. The purpose may for example, be a training of a table recognition model, a validation of the table recognition model or a test of the table recognition model.

In step 405, a Cascading Style Sheets (CSS file) may be selected and loaded. The selection may for example, be a random selection from a predefined set of CSS files. Using web technologies (such as CSS, HTML, DOM) may offer the maximum level of control over the appearance of the table. This may enable to precisely specify any visual aspect of the generated tables.

The table structure (or table skeleton) may be generated in step 406 using the configuration file.

The table is filled in step 407 with content using a selected table content template of the table content templates.

A HTML code descriptive of the table may be generated in step 408.

The table may be rendered in step 409 in the headless browser using the HTML code.

Annotations descriptive of the generated table may be saved in step 410. Step 404 may automatically be executed after step 410. The annotations may include BBOX values of the cells of the table.

In step 411, the headless browser may be stopped and the method may end in step 412.

Steps 404 to 410 may be repeated until the whole dataset is generated.

Figure 5:
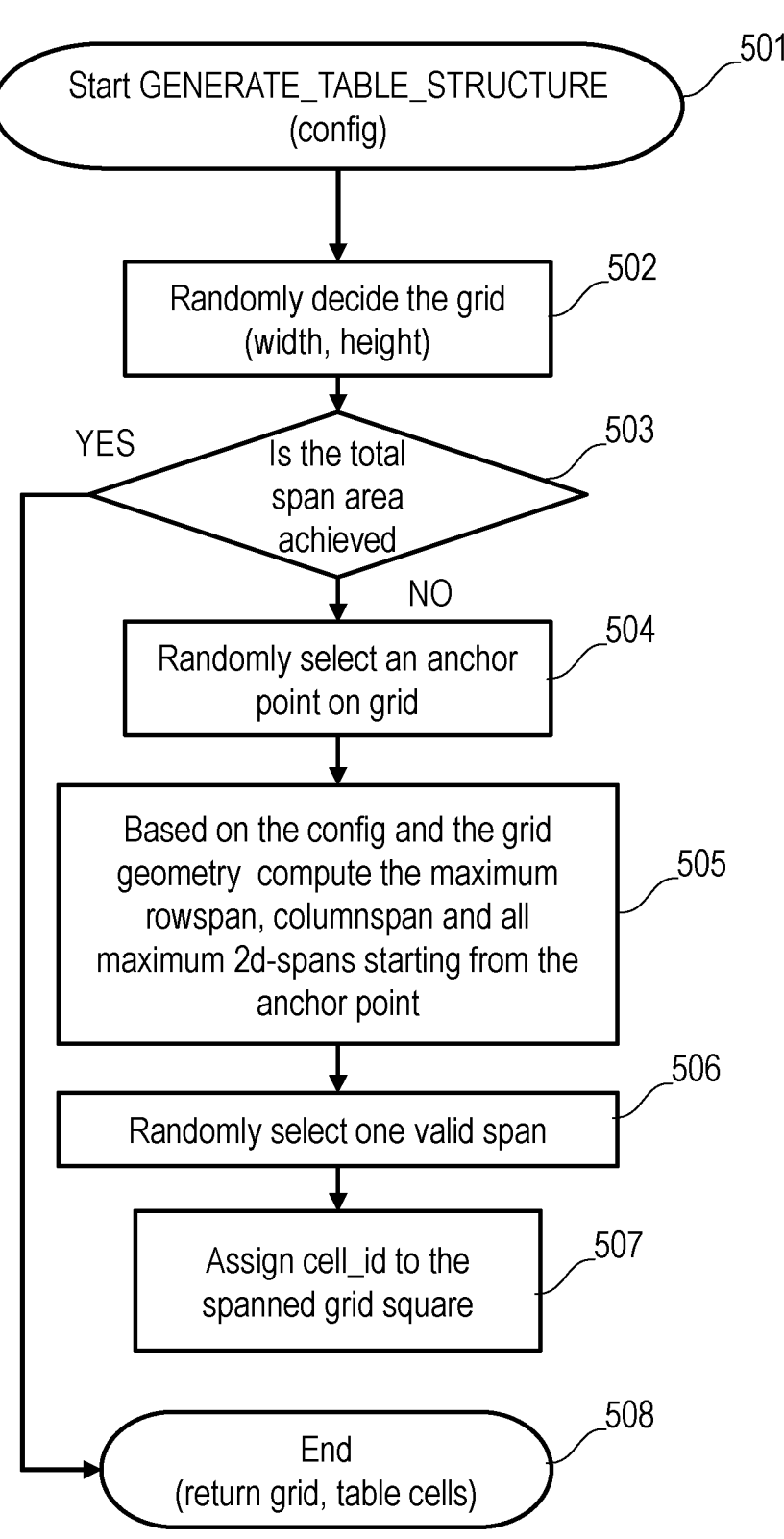
FIG. 5 is a flowchart of a method for generating a table structure in accordance with an example of the present subject matter.

FIG. 5 is a flowchart of a method for generating a table structure in accordance with an example of the present subject matter. The method of FIG. 5 may for example, provide details of step 406 of FIG. 4.

The generation of the table structure may be triggered or started in step 501. Using the configuration file, the table grid may be decided or defined in step 502. For example, the configuration file includes possible values of the number of rows and number of columns, possible values of a spanning area (or span area) of the table, the maximum HTML columnspan and maximum HTML rowspan. The definition of the table 502 may be performed by randomly selecting a number of rows and number of columns and a spanning area using the configuration file. The defined table may include an initial set of elementary cells each spanning one row and one column.

It may be determined in step 503 whether the total spanning area is achieved. If the total spanning area is achieved, step 508 may be performed, otherwise, steps 504 to 507 may be performed.

A random anchor point may be selected in step 504 on the grid. The anchor point may represent one elementary cell of the table. Thus, step 504 may include the selection of the one elementary cell.

Using the configuration file and the geometry of the grid, the maximum HTML rowspan, columnspan and all maximum 2d-spans starting from the anchor point may be computed in step 505. This may result in multiple possible spans to be performed starting from the anchor point.

One valid span of the multiple spans may be randomly selected in step 506. This may result in a spanning cell. A cell ID may be assigned in step 507 to the spanning cell.

In step 508, the method may end by providing the generated skeleton table with the cell IDs.

Figure 6:
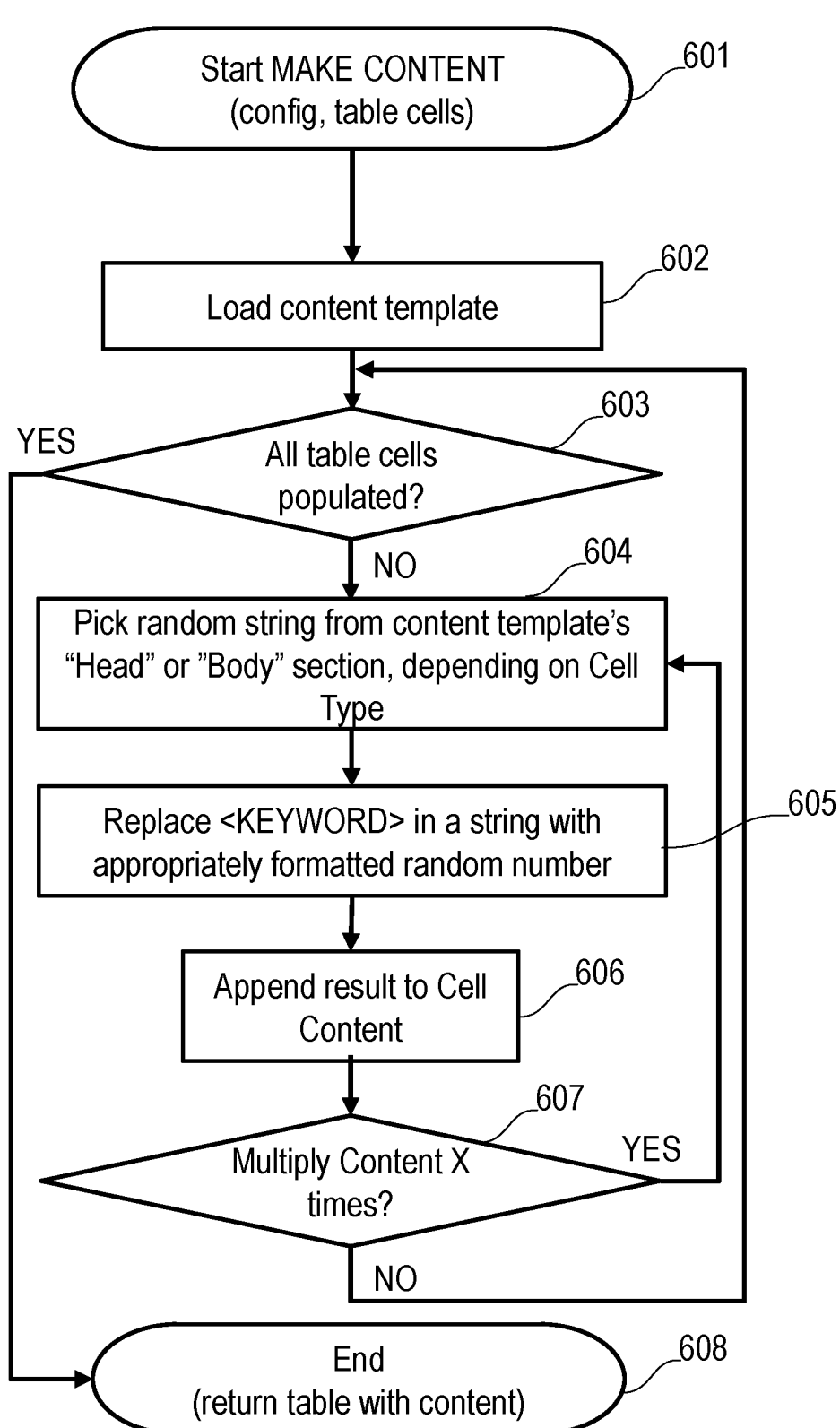
FIG. 6 is a flowchart of a method for filling a skeleton table with content in accordance with an example of the present subject matter.

FIG. 6 is a flowchart of a method for filling a skeleton table with content in accordance with an example of the present subject matter. The method of FIG. 6 may for example, provide details of step 407 of FIG. 4.

At the start of the method, the configuration file and the skeleton table may be provided in step 601.

A selected table content template may be loaded in step 602. It may be determined in step 603 whether all table cells of the skeleton table are populated or filled. In case all table cells of the skeleton table are populated, step 608 may be performed, otherwise, steps 604 to 607 may be performed for a current (not yet processed) cell of the table.

In step 604, a string may be randomly selected from the selected table content template. For example, if the current cell is a header cell, the string may be selected from the header content of the selected table content template. If the current cell is a table body cell the string may be selected from the table body content of the selected table content template.

A value of a non-string type (referred to as <keyword>) that is defined in the selected table content template may be generated in step 605. This value may for example, be an integer number. This step 605 may include the instantiation of the non-string type that is present in the selected table content template.

The selected string and/or the generated keyword value may be appended into the current cell in step 606.

It may be determined in step 607 whether content of the current cell is to be multiplied a predefined number X of times. If it is determined that the content is to be multiplied steps 604 to 606 may be repeated until the content is multiplied that number of times. If it is determined that the content is not to be multiplied, steps 603 to 608 may be performed.

In step 608, the method may end by providing the populated table.

Figure 7:
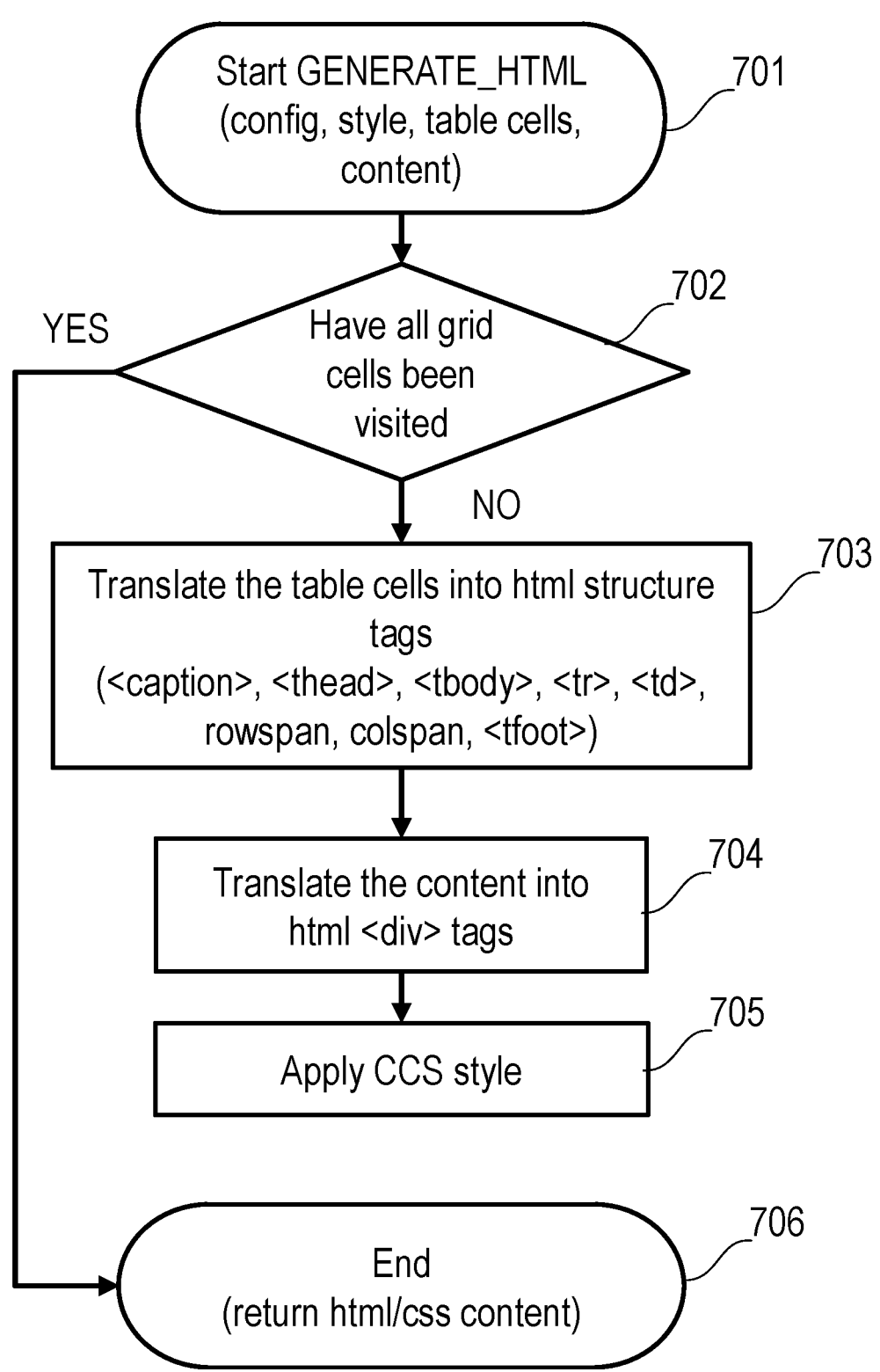
FIG. 7 is a flowchart of a method for generating a HTML code for a table in accordance with an example of the present subject matter.

FIG. 7 is a flowchart of a method for generating a HTML code for a table in accordance with an example of the present subject matter. The method of FIG. 7 may for example, provide details of step 408 of FIG. 4.

At the start of the method, the configuration file, a selected CSS file and the populated table may be provided in step 701.

It may be determined in step 702 whether all cells of the table have been visited or processed. If all cells are visited step 706 may be performed, otherwise, steps 703 to 705 may be performed for a current (not yet processed) cell of the table.

The table cell may be translated in step 703 into HTML structure tags such as tags: <caption>, <thead>, <tbody>, <tr>, <td>, rowspan, colspan, <tfoot>.

The content of the table cell may be translated in step 704 into HTML <div> tags.

The style of the selected CSS file may be applied in step 705 for the current cell.

In step 706, the method may end by providing the generated HTML code.

Figure 8:
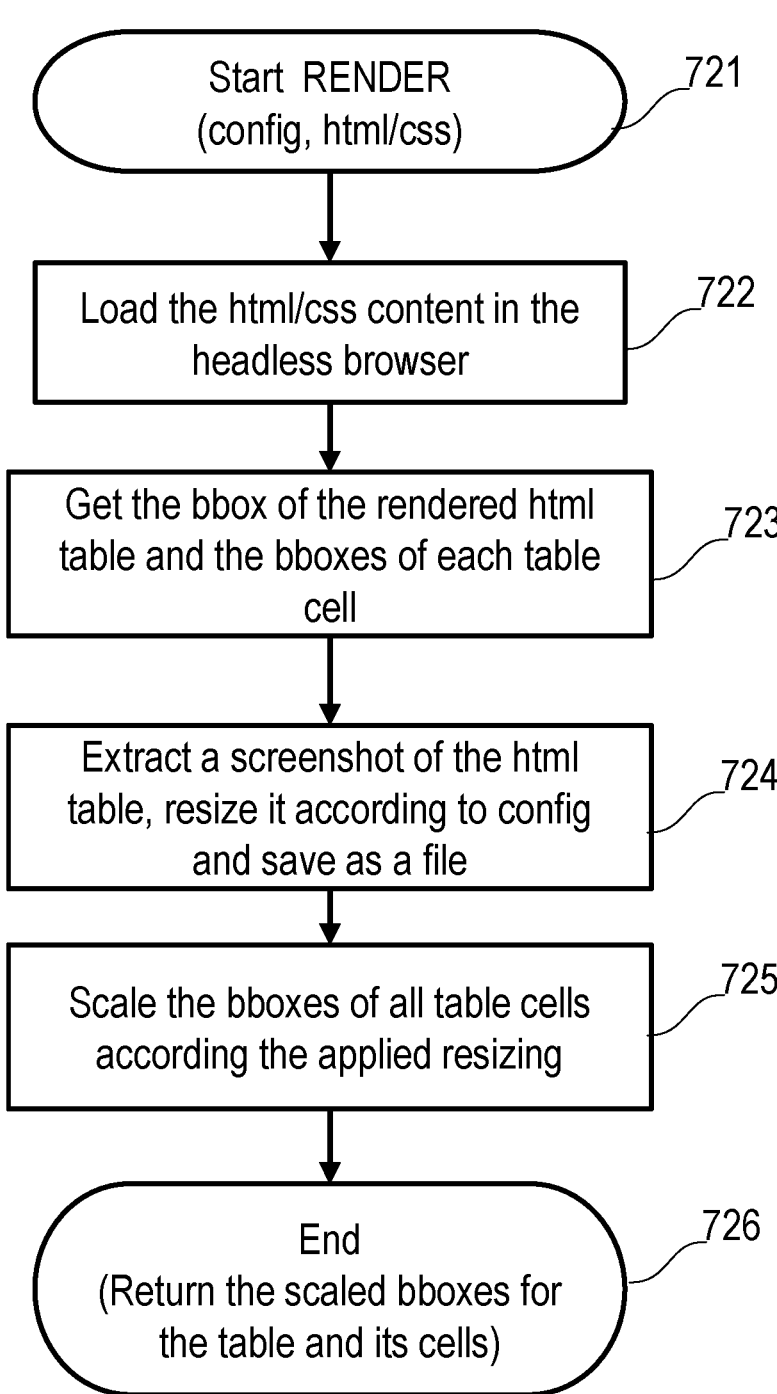
FIG. 8 is a flowchart of a method for rendering a table in accordance with an example of the present subject matter.

FIG. 8 is a flowchart of a method for rendering a table in accordance with an example of the present subject matter. The method of FIG. 8 may for example, provide details of step 409 of FIG. 4.

At the start of the method, the configuration file and the HTML code of the table may be provided in step 721.

The HTML code of the table may be loaded in step 722 into the headless browser.

The bbox of the rendered html table and the bboxes of each table cell may be get in step 723. In step 724, a screenshot of the html table may be extracted, resized according to the configuration and saved as a file.

The bboxes of all table cells may be scaled in step 725 according to a potentially applied resizing.

In step 726, the method may end by providing the (scaled) bboxes for the table and its cells. These bboxes may be used to create the annotation file for the table as shown in FIG. 10.

Computing environment 800 contains an example of an environment for the execution of at least some of the computer code involved in performing the inventive methods, such as image table generation code 900. In addition to image table generation code 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and image table generation code 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 9. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in image table generation code 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in image table generation code 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

FIG. 10 shows an example content of an annotation file in accordance with an example of the present subject matter. The annotation file includes attributes and associated values. The attributes may be used to understand the table, that is they provide a description of the table. The attribute (named "split") may for example, indicate that the table image is to be used for training. The attribute (named "cells") may for example, provide information on each cell of the table such as the cell ID, the bbox of the cell, whether the cell is a header cell or not etc. The attribute (named "structure") may for example, indicate the structure of the table via the HTML tags of the table. The annotation file may further indicate the bbox of the table.

FIG. 11 shows an example content of a configuration file in accordance with an example of the present subject matter. The configuration file includes attributes and associated values. The attributes indicate table parameters that can be used to generate a table. For example, the attribute (named "span_types") may for example, be the type of spans that can be used for generating the table. The attribute (named "styles") may list the possible CSS style files that can be used to generate the table. The attribute (named "contents") may list the possible table content templates that can be used to generate the table and so on.

Figure 12:
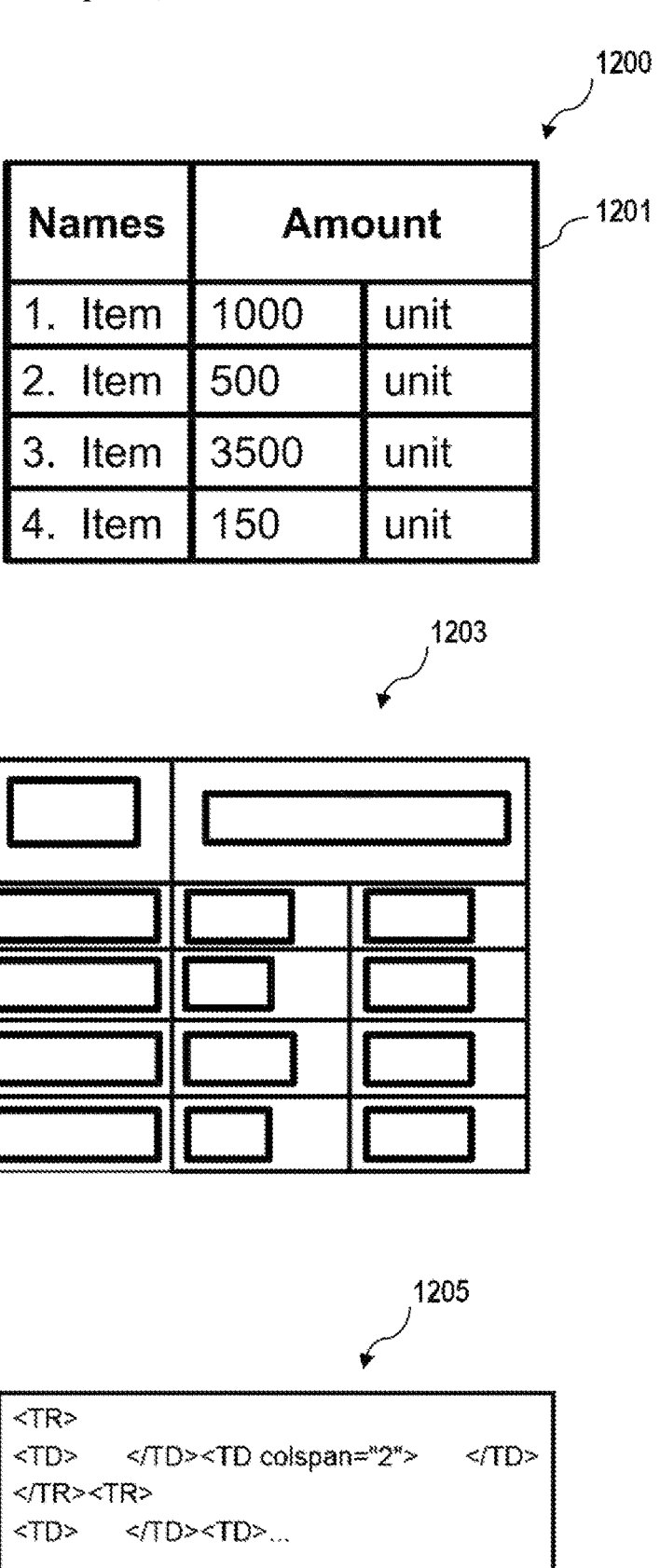
FIG. 12 shows an example of a generated table and associated structural and geometrical information in accordance with an example of the present subject matter.

FIG. 12 shows an example generated table 1200 having one spanning cell 1201 that spans two columns and remaining cells of the table 1200 are elementary cells. The table 1200 includes three columns and five rows. The geometrical information of the table 1200 may be obtained by bounding boxes around the cells of the table 1200 as indicated by table 1203. The structural information of the table 1200 may be obtained by the HTML code 1205 that represents the table 1200. This structural and geometrical information may for example, be used to create an annotation file as shown in FIG. 10.

Figure 13:
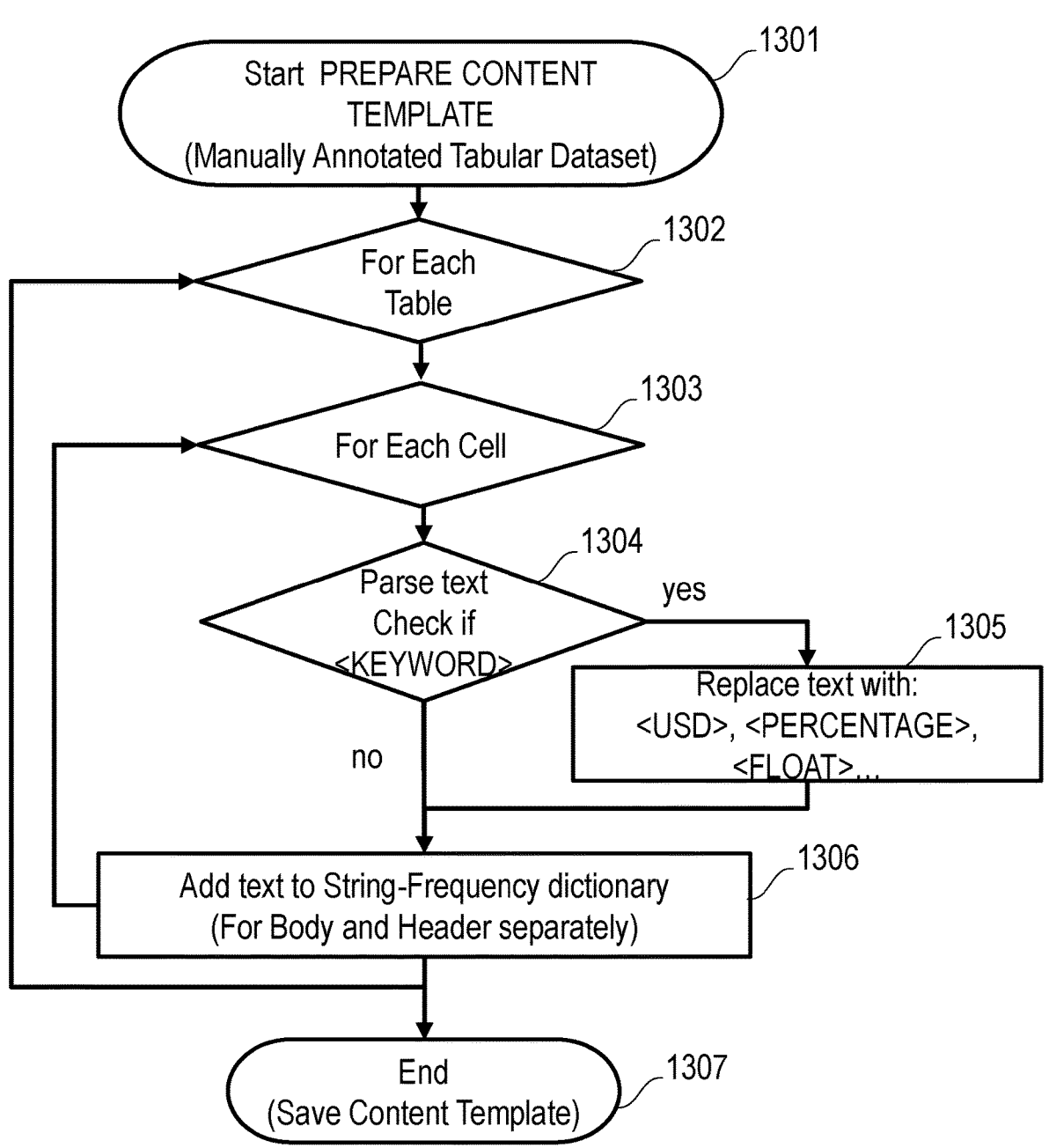
FIG. 13 is a flowchart of a method for generating a table content template in accordance with an example of the present subject matter.

FIG. 13 is a flowchart of a method for generating a table content template in accordance with an example of the present subject matter.

At the start of the method, a manually annotated tabular dataset may be provided in step 1301. For each table (1302) and for each cell (1303), the text may be parsed in step 1304 and it may be determined whether the parsed text includes a keyword (or non-string type). If the parsed text includes a keyword, the keyword identified in the text may be replaced in step 1305 by a name descriptive of the keyword depending on the type of the keyword identified e.g., if the keyword is a float value 20.13, this value may be replaced by the name <FLOAT>. If the parsed text is not a keyword, the text may be added in step 1306 to a string-frequency dictionary e.g., for body and header separately. The table content template may contain dictionaries of strings to be used in header and body cells. For example, the table content template may contain dictionaries of pairs: string-frequency. A random selection of dictionary entries uses a distribution that respects the term frequencies. In step 1307, the method may end by saving the content template.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for automatically generating table images, the method comprising:

determining a table configuration, the table configuration comprising a number of rows of the table, a number of columns of the table and a spanning area of the table, the spanning area indicating a fraction of spanning cells in the table;

providing table content templates comprising table contents;

generating the table in accordance with the table configuration, wherein generating the table in accordance with the table configuration comprises:

defining a table having a cell, named elementary cell, in each crossing point of a row and column of the table;

randomly selecting an elementary cell of the table;

merging the selected elementary cell with one or more elementary cells along the row of the selected elementary cell and merging the selected elementary cell with one or more elementary cells along the column of the selected elementary cell, resulting in a spanning cell;

repeating the random selection and the merging steps until the spanning area is achieved; and in response to determining that the spanning area is achieved, providing the table;

selecting a table content template of the table content templates;

inserting content into cells of the table using the selected content template;

creating an image table of an appearance of the table; and providing the image table.

2. The method of claim 1, wherein providing the image table comprises:

providing an annotation file comprising a structural information of the image table and geometrical information of the image table.

3. The method of claim 1, further comprising:

repeating the method for providing multiple image tables with respective table configurations; and providing the multiple image tables in association with annotation files as a training dataset for training a table recognition model to identify layout elements of image tables.

4. The method of claim 1, wherein each table content template represents a different domain ontology, wherein the table configuration further indicates a desired domain ontology, wherein the selected table content template is the template whose domain ontology matches the desired domain ontology.

5. The method of claim 1, wherein providing the table content template comprises:

providing one or more databases of image tables;

parsing content of cells of the image tables in the databases;

tokenizing the parsed content, resulting in tokens;

determining types of the resulting tokens, the determined types comprise string type and non-string type;

determining an occurrence frequency of each token of string type;

inserting in the table content template the most frequent string tokens; and inserting in the table content template the determined non-string types.

6. The method of claim 5, wherein inserting content into the cells of the table using the selected table content template comprises, for each cell of the table:

randomly selecting one or more token strings of the selected table content template; and inserting in the cell the selected token strings.

7. The method of claim 5, wherein inserting content into cells of the table using the selected table content template comprises, for each cell of the table:

randomly generating one or more values of a non-string type in the selected table content template; and inserting in the cell the generated values.

8. The method of claim 1, wherein the creating of the image table comprises:

rendering the table using a headless browser; and taking a screenshot of the rendered table.

9. The method of claim 1, further comprising:

providing table style templates, the table style template describing a presentation style of the table;

selecting one of the table style templates based on the table configuration; and performing the generation of the table and the insertion of the content in the cells in accordance with styles defined by the selected table style template.

10. The method of claim 9, wherein each table style template represents a respective domain ontology, wherein the table configuration further indicates a desired domain ontology, wherein the selected table style template is the template whose domain ontology matches the desired domain ontology.

11. The method of claim 1, the table configuration further indicating a header and body of the table, wherein the table content template comprises header table contents and body table content.

12. The method of claim 3, further comprising:

training the table recognition model to identify layout elements of image tables using the generated image tables and associated annotation files.

13. The method of claim 12, further comprising:

using the trained model for recognizing image table objects.

14. The method of claim 3, wherein the table configuration further indicates a desired domain ontology, wherein the table configuration in each repetition of the method for providing multiple image tables has a number of rows and a number of columns and spanning area and domain ontology that are different from each previously used table configuration.

15. The method of claim 1, further comprising:

storing the generated image table in a database.

16. The method of claim 4, wherein upon determining the domain ontology is a subdomain of the desired domain ontology, the domain ontology matches the desired domain ontology.

17. The method of claim 2, wherein the structural information of the image table comprises:

a number of rows inside a header of the table, types of cell spans, the total amount of spanned cells, presence of cell spans in both in the header and a body of the table, wherein the geometrical information of the image table comprises: table position, cell positions and cell sizes.

18. A computer program product for automatically generating table images, the computer program product comprising:

one or more computer-readable storage media and program instructions stored on the one or more computer-readable storage media, the program instructions executable by a computing system to cause the computing system to perform a method comprising:

determining a table configuration, the table configuration comprising a number of rows of a table, a number of columns of the table and a spanning area of the table, the spanning area indicating a fraction of spanning cells in the table;

providing table content templates comprising table contents;

generating the table in accordance with the table configuration, wherein generating the table in accordance with the table configuration comprises:

defining a table having a cell, named elementary cell, in each crossing point of a row and column of the table;

randomly selecting an elementary cell of the table;

merging the selected elementary cell with one or more elementary cells along the row of the selected elementary cell and merging the selected elementary cell with one or more elementary cells along the column of the selected elementary cell, resulting in a spanning cell; and repeating the random selection and the merging steps until the spanning area is achieved;

selecting a table content template of the table content templates;

inserting content into cells of the table using the selected content template;

creating an image table of an appearance of the table; and providing the image table.

19. A computer system for automatically generating table images, the computer system comprising:

one or more computer processors, one or more computer-readable storage media, and program instructions stored on the one or more of the computer-readable storage media for execution by at least one of the one or more processors, wherein the computer system is capable of performing a method comprising:

determining a table configuration, the table configuration comprising a number of rows of a table, a number of columns of the table and a spanning area of the table, the spanning area indicating a fraction of spanning cells in the table;

providing table content templates comprising table contents;

generating the table in accordance with the table configuration, wherein generating the table in accordance with the table configuration comprises:

defining a table having a cell, named elementary cell, in each crossing point of a row and column of the table;

randomly selecting an elementary cell of the table;

merging the selected elementary cell with one or more elementary cells along the row of the selected elementary cell and merging the selected elementary cell with one or more elementary cells along the column of the selected elementary cell, resulting in a spanning cell; and repeating the random selection and the merging steps until the spanning area is achieved;

selecting a table content template of the table content templates;

inserting content into cells of the table using the selected content template;

creating an image table of an appearance of the table; and providing the image table.

* * * * *